L. SOSEMAN.
HOG FEEDING DEVICE.
APPLICATION FILED MAR. 12, 1919.
1,326,002.
Patented Dec. 23, 1919.
Fig. 1.
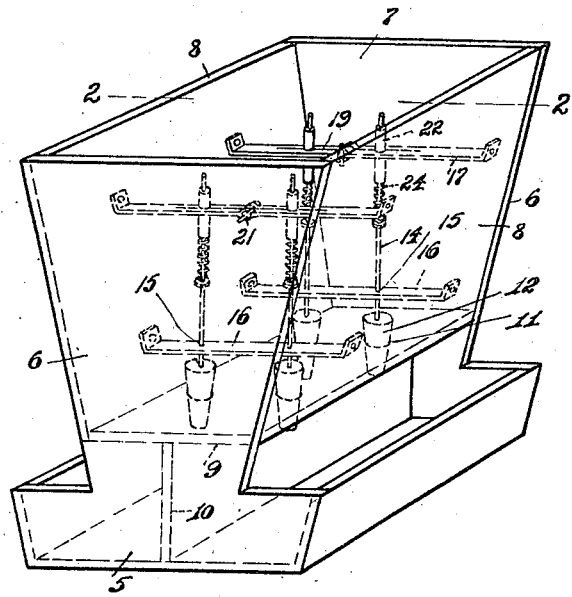
Fig. 2.
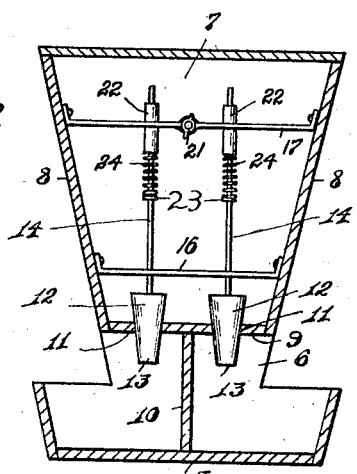
Fig. 3.
Laban Soseman
INVENTOR
By George J. Ottsch
ATTORNEY.

UNITED STATES PATENT OFFICE.

LABAN SOSEMAN, OF WASHINGTON TOWNSHIP, KEOKUK COUNTY, IOWA.

HOG-FEEDING DEVICE.

1,326,002. Specification of Letters Patent. Patented Dec. 23, 1919.

Application filed March 12, 1919. Serial No. 282,230.

*To all whom it may concern:*

Be it known that I, LABAN SOSEMAN, a citizen of the United States, residing in Washington township, in the county of Keokuk and State of Iowa, have invented certain new and useful Improvements in Hog-Feeding Devices, of which the following is a specification.

The invention relates to improvements in cattle feeding devices, and more particularly to a hog feeding device self-operated for the dispensing of food from a container.

The primary object of the invention resides in the provision of a feeding device adapted to be operated by the hog itself in a manner to permit food to be dispensed from a container, and in a manner so that limited quantities only will be available at a time for consumption, so that there will be a more equal distribution of the food among a given number of hogs than when dumped upon the ground, as is the usual practice, which usually results in the more aggressive hogs devouring the greater portion thereof. A further object of the invention resides in the provision of means controlling the dispensing of the food from the container, which may be easily and quickly regulated and adapted for foods of different character, such as for food of a liquid, semi-liquid or dry state, or for grain which varies in size.

With the above and other objects in view, the invention in the preferred form of details will be described in the following specification, reference being had particularly to the accompanying drawings in which:—

Figure 1 is a perspective view of a device constructed in accordance with the invention.

Fig. 2 is a sectional view taken on the line 2—2 of Fig. 1.

Fig. 3 is an enlarged fragmentary plan view of the support for the valve stem guide member.

Referring now more specifically to the drawings, the numeral 5 designates the base of the device which is in the form of a trough, the end members 6 of which are extended upwardly and constitute the end members of a food container or hopper 7, which includes the side members 8—8 and the bottom 9. The side members 8—8 and the bottom 9 are spaced from the trough, and a partition 10 is arranged centrally and longitudinally of the trough to serve in part as a support for the container bottom which rests thereon, and in part as a division for the trough, so that the hogs may feed from either side of the device. The bottom 9 may be provided with one or more discharge openings 11, according to the feeding capacity desired. Such openings are controlled to regulate the flow of food therethrough by a cone-shaped valve 12, adapted to seat in the opening and to project therethrough, so that the hog may nose the valve and raise same from its seat. The advantage of the cone-shaped valve lies in its simple structure, the fact that it limits its degree of projection through the discharge opening, and presents a portion below the container bottom, as at 13, which the head of the hog will engage in rummaging the trough and raise the same, thus permitting a quantity of food to flow into the trough. Another advantage in the cone formation of the valve is that it permits the food, especially grain, to readily flow past the valve into the discharge opening, as contrasted with the valve structures which require the grain to flow around and under the valve before reaching the discharge opening, thus impeding more or less the freedom of flow of the grain.

Each valve is provided with a valve stem 14, which extend through an aperture 15 in a guide bar 16 disposed slightly above the upper ends of the valves, contact with which bar limits the upward movement of the valves, and which bar also serves to keep the food from weighting down the valves by preventing the same from directly bearing on the upper ends thereof. Suitably secured to the side walls of the container and disposed directly above each guide bar 16, and in spaced relation therewith, is a bar 17, having round apertures 18 therein which are intersected by a longitudinal slit or slot 19, the opposite portions of which bar as divided by such slit being capable of being drawn together by a bolt 20 in coöperation with a thumb-nut 21, whereby to bind and hold relatively short lengths of tubing 22, through which the upper ends of the valve stems slidably extend. Encircling the valve stems and interposed between the lower ends of the tubing and a collar 23 fixed to the valve stems, are coil springs 24 tensioned to normally hold the valves seated.

As the freedom of flow of different foods will vary, it is desirable to vary the spring pressure on the valves, so that they may be opened more or less easily for a given distance, to control and limit the quantity thereof discharged into the trough in a given time. This is accomplished by simply unscrewing the thumb-nut 21, which will release the binding engagement of the bar 17 on the tubing 22, when the latter may be raised or lowered, as the case may be, thus bringing the springs under greater or less tension, as will be obvious.

While the foregoing is the preferred form of my invention, I desire it to be understood that I do not limit myself to the precise structure shown and described, as it is obvious that same may be variously modified without departing from the spirit of the invention.

Having thus described my invention, what is claimed is:—

1. A device of the character described, comprising a trough, a container supported above the trough and having a discharge opening in the bottom thereof, a valve for said opening having an upstanding stem, means for slidably guiding the stem, a spring bearing upon the stem and against said guiding means, and clamping means for adjustably supporting the guiding means for varying the spring tension.

2. A device of the character described, comprising a trough, a container supported above the trough having a discharge opening in the bottom thereof, a valve for said opening having an upstanding stem, a tubular guide member slidably receiving the stem, a spring bearing upon the stem and against the lower end of the guide member, a split bar between which the guide member is held, and means for drawing the split portions of the bar together to bind the guide member for adjustably supporting the same.

In testimony whereof I affix my signature.

LABAN SOSEMAN.